United States Patent
Abir

(10) Patent No.: US 8,744,835 B2
(45) Date of Patent: Jun. 3, 2014

(54) CONTENT CONVERSION METHOD AND APPARATUS

(75) Inventor: Eli Abir, Cross River, NY (US)

(73) Assignee: Meaningful Machines LLC, New York, NY (US)

(*) Notice: Subject to any disclaimer, the term of this patent is extended or adjusted under 35 U.S.C. 154(b) by 1857 days.

(21) Appl. No.: 10/157,894

(22) Filed: May 31, 2002

(65) Prior Publication Data

US 2003/0061025 A1 Mar. 27, 2003

Related U.S. Application Data

(63) Continuation-in-part of application No. 10/024,473, filed on Dec. 21, 2001.

(60) Provisional application No. 60/276,107, filed on Mar. 16, 2001, provisional application No. 60/299,472, filed on Jun. 21, 2001.

(51) Int. Cl.
    G06F 17/27 (2006.01)

(52) U.S. Cl.
    USPC ................................. 704/9; 704/1; 704/10

(58) Field of Classification Search
    USPC ............ 704/1, 2, 9, 10, 251, 256, 4; 715/530, 715/531
    See application file for complete search history.

(56) References Cited

U.S. PATENT DOCUMENTS

| | | | |
|---|---|---|---|
| 4,839,853 A | 6/1989 | Deerwester et al. | |
| 4,849,898 A * | 7/1989 | Adi | 707/5 |
| 5,278,980 A | 1/1994 | Pedersen et al. | |
| 5,406,480 A * | 4/1995 | Kanno | 704/10 |
| 5,579,224 A | 11/1996 | Hirakawa et al. | |
| 5,619,709 A * | 4/1997 | Caid et al. | 715/532 |
| 5,630,121 A | 5/1997 | Braden-Harder et al. | |
| 5,652,898 A * | 7/1997 | Kaji | 704/10 |
| 5,659,765 A | 8/1997 | Nii | |
| 5,675,819 A * | 10/1997 | Schuetze | 704/10 |
| 5,724,593 A * | 3/1998 | Hargrave, III et al. | 704/7 |
| 5,799,268 A | 8/1998 | Boguraev | |
| 5,867,811 A | 2/1999 | O'Donoghue | |
| 5,907,821 A * | 5/1999 | Kaji et al. | 704/4 |
| 5,913,215 A | 6/1999 | Rubinstein et al. | |
| 5,933,822 A | 8/1999 | Braden-Harder et al. | |
| 5,987,446 A * | 11/1999 | Corey et al. | 707/3 |
| 5,995,920 A * | 11/1999 | Carbonell et al. | 704/9 |
| 6,070,134 A | 5/2000 | Richardson et al. | |
| 6,081,775 A | 6/2000 | Dolan | |

(Continued)

OTHER PUBLICATIONS

"Statistical Method and Apparatus for Learning Translation Relationships Among Words" by Robert C. Moore, United States Patent Application Publication No. 2002/0198701 A1, published Dec. 26, 2002.*

(Continued)

*Primary Examiner* — Douglas Godbold
(74) *Attorney, Agent, or Firm* — Crowell & Moring LLP

(57) ABSTRACT

A method and apparatus for analyzing documents and thereby determining the association between words in a language. The method includes providing a collection of documents, selecting a first word or word string, and a second word or word string occurring in the documents. The method further involves associating first word or word strings and second word or word strings with common word or word strings based on frequency of occurrence of the common word or word strings within the ranges.

4 Claims, 3 Drawing Sheets

CROSS-IDEA DATABASE

| 1 | 2 | 3 | 4 |
|---|---|---|---|
| System A Segments | System B Segments by Rank of Frequency after subtraction | Direct Frequencies | Frequencies after subtraction |
| Da1 | Db1+Db3+Db4 | 25 | 25 |
| Da1 | Db9+Db10 | 19 | 19 |
| Da1 | Db1 | 35 | 10 |
| Da1 | Db1+Db3 | 30 | 5 |
| Da2 | Db2+Db6 | 20 | 20 |
| Da2 | Db12 | 15 | 15 |
| Da2 | Db2 | 25 | 5 |
| Da3+Da4 | Db5+Db7 | 15 | 15 |
| Da3+Da4 | Db5 | 25 | 10 |

(56) References Cited

U.S. PATENT DOCUMENTS

| | | |
|---|---|---|
| 6,085,162 A | 7/2000 | Cherny |
| 6,236,958 B1 * | 5/2001 | Lange et al. ............... 704/8 |
| 6,253,170 B1 | 6/2001 | Dolan |
| 6,697,793 B2 | 2/2004 | McGreevy |
| 6,859,800 B1 * | 2/2005 | Roche et al. ............... 707/3 |
| 6,871,174 B1 * | 3/2005 | Dolan et al. ............... 704/9 |
| 6,901,399 B1 * | 5/2005 | Corston et al. ............... 707/6 |
| 6,925,433 B2 * | 8/2005 | Stensmo ............... 704/9 |
| 7,031,910 B2 * | 4/2006 | Eisele ............... 704/10 |

OTHER PUBLICATIONS

"Method and Apparatus for Example-Based Machine Translation with Learned Word Associations" by Pinkham et al., United States Patent Application Publication No. 2004/0172235 A1, published Sep. 2, 2004.*

* cited by examiner

| CROSS-IDEA DATABASE | | | |
|---|---|---|---|
| 1 | 2 | 3 | 4 |
| System A Segments | System B Segments by Rank of Frequency after subtraction | Direct Frequencies | Frequencies after subtraction |
| Da1 | Db1+Db3+Db4 | 25 | 25 |
| Da1 | Db9+Db10 | 19 | 19 |
| Da1 | Db1 | 35 | 10 |
| Da1 | Db1+Db3 | 30 | 5 |
| Da2 | Db2+Db6 | 20 | 20 |
| Da2 | Db12 | 15 | 15 |
| Da2 | Db2 | 25 | 5 |
| Da3+Da4 | Db5+Db7 | 15 | 15 |
| Da3+Da4 | Db5 | 25 | 10 |

Figure 1

CONTENT CONVERSION METHOD AND APPARATUS

RELATED APPLICATIONS

This application is a continuation-in-part of U.S. application Ser. No. 10/024,473, filed on Dec. 21, 2001, and claims the benefit of U.S. Provisional Application No. 60/276,107 filed Mar. 16, 2001, and U.S. Provisional Application No. 60/299,472 filed Jun. 21, 2001, all of which are hereby incorporated by reference.

COMPUTER PROGRAM LISTING APPENDIX

This application includes in a computer program listing appendix on DISC 1 the following computer program listings: Program1 in file program1.txt, created on May 28, 2002 and containing 12 kilobytes; Program2 in file program2.txt created on May 28, 2002 and containing 2 kilobytes, and Program3 in file program3.txt created on May 28, 2002 and containing 17 kilobytes; Program4 in file program4.txt created on May 31, 2002 and containing 8 kilobytes.

FIELD OF THE INVENTION

This invention relates to a method and apparatus for creating a database for use in converting language from one state to a second state.

BACKGROUND

Devices and methods for automatically translating documents from one language to another are known. However, these devices and methods often fail to accurately translate documents from one language to another, can consume large amounts of time and can be inconvenient to use. In addition to human-based translators, other known devices include commercially available machine translation software. These known systems have flaws that render them susceptible to errors, slow speed and inconvenience. Known translation devices and methods cannot consistently return accurate translations for text input and therefore frequently require intensive user intervention for proof reading and editing. Accurate machine translation is more complicated than providing devices and methods that make word-for-word translations of documents. In these word-for-word systems, the translation often times makes little sense to readers of the translated document, as the word-for-word method results in wrong word choices and incoherent grammatical units.

To overcome these deficiencies, known translation devices have for decades attempted to make choices of word translations within the context of a sentence based on a combination or set of lexical, morphological, syntactic and semantic rules. These systems, known in the art as "Rule-Based" machine translation (MT) systems are flawed because there are so many exceptions to the rules that they cannot provide consistently accurate translation.

In addition to Rule-Based MT, in the last decade a new method for MT known as "example-based" (EBMT) has been developed. EBMT makes use of sentences (or possibly portions of sentences) stored in two different languages in a cross-language database. When a translation query matches a sentence in the database, the translation of the sentence in the target language is produced by the database providing an accurate translation in the second language. If a portion of a translation query matches a portion of a sentence in the database, these devices attempt to accurately determine which portion of the sentence mapped to the source language sentence is the translation of the query.

EBMT systems cannot provide accurate translation of a broad language because the databases of cross-language sentences are built manually and will always be predominantly "incomplete." Another flaw of EBMT systems is that partial matches are not reliably translated. Attempts have been made to automate the creation of cross-language databases using pairs of translated documents for use in EBMT. However, these efforts have not been successful in creating meaningful, accurate cross-language databases of any significant size. None of these attempts use an algorithm that reliably and accurately distill the translations of a significant number of words and word-strings from a pair of translated documents.

Some translation devices combine both Rule-Based and EBMT engines. Although this combination of approaches may yield a higher rate of accuracy than either system alone, the results remain inadequate for use without significant user intervention and editing.

The problems faced when attempting to translate documents from one language to another can apply more generally to the problem of converting data representing ideas or information from one state, say words, into data representing the ideas in another state, for example, mathematical symbols. In such cases cross-idea association databases that associate data in one state with equivalent data in the second state must be consulted. Therefore, a need exists for an improved and more efficient method and apparatus for creating dictionaries or databases that associate equivalent ideas in different languages or states, (e.g., words, word-strings, sounds, movement and the like) and for translating or converting ideas conveyed by documents in one language or state into the same or similar ideas represented by documents in a second language or state.

The invention relates to manipulating content using a cross-idea association database. In particular, the present invention provides a method and apparatus for creating a database of associated ideas and provides a method and apparatus for utilizing that database to convert ideas from one state into other states.

In one embodiment, and by example, the present invention provides a method and apparatus for creating a language translation database, where two languages form the database of associated ideas. The present invention also provides a method and apparatus for utilizing that language database to convert documents (representing ideas) from one language to another (or more generally, from one state to another). However, the present invention is not limited to language translation, although that preferred embodiment will be presented. The database creation aspect of the present invention may be applied to any ideas that are related in some manner but expressed in different states and the conversion aspect of the present invention may be applied to accurately translate ideas from one state to another.

In another embodiment, the database creation aspect of the present invention can be used to make associations between ideas within a single language and their relationship to one another, to be used in artificial intelligence applications.

The application of the present invention to a language translation embodiment will now be described. As used herein, the terms related to converting, translating, and manipulating are used interchangeably and in their broadest sense.

SUMMARY OF THE INVENTION

One object of the present invention is to facilitate the efficient translation of documents from one language or state to another language or state by providing a method and apparatus for creating and supplementing cross-idea association databases. These databases generally associate data in a first form or state that represents particular ideas or pieces of information with data in a second form or state that represents the same ideas or pieces of information.

Another object of the present invention is to facilitate the translation of documents from one language or state to another language or state by providing a method and apparatus for creating a second document comprising data in a second state, form, or language, from a first document comprising data in a first state, form, or language, with the result that the first and second documents represent substantially the same ideas or information.

Yet another object of the present invention is to facilitate the translation of documents from one language or state to another language or state by providing a method and apparatus for creating a second document comprising data in a second state, form, or language, from a first document comprising data in a first state, form, or language, with the result that the first and second documents represent substantially the same ideas or information, and wherein the method and apparatus includes using a cross-idea association database.

Yet another object of the present invention is to provide the translation of documents (in a broad sense, the conversion of ideas from one state to another state) in a real-time manner.

The present invention achieves these and other objects by providing a method and apparatus for creating a cross-idea database. The method and apparatus for creating the cross-idea database can include providing two or more documents, each document being in a different language but representing substantially the same ideas. The documents can be exact translations of the same text, i.e. parallel text documents, or can be translations containing generally related text, i.e. comparable text documents. The present invention selects at least a first and a second occurrence of all words and word strings that have a plurality of occurrences in the first language in the available cross-language documents. It then selects at least a first word range and a second word range in the second language documents, wherein the first and second word ranges correspond to the first and second occurrences of the selected word or word-string in the first language documents. Next, it compares words and word-strings found in the first word range with words and word strings found in the second word range and, locating words and word-strings common to both word ranges, and stores those located common words and word strings in the cross-idea database. The invention then associates in said cross-idea database located common words or word strings in the two ranges in the second language with the selected word or word string in the first language, ranked by their association frequency (number of recurrences), after adjusting the association frequencies as detailed herein. By testing common word and word-strings across languages in Parallel or Comparable Texts, the database will resolve more associations as more Parallel or Comparable Text becomes available in a variety of different languages.

The present invention also achieves these and other objectives by providing a method and apparatus for converting a document from one state to another state. The present invention provides a database comprised of data segments in a first language associated with data segments in a second language (created through methods described above or manually). The present invention translates text by accessing the above-referenced database, and identifying the longest word string in the document to be translated (measured by number of words) beginning with the first word of the document, that exists in the database. The system then retrieves from the database a word string in the second language associated with the located word string from the document in the first language. The system then selects a second word string in the document that exists in the database and has an overlapping word (or alternatively word string) with the previously identified word string in the document, and retrieves from the database a word string in the second language associated with the second word string in the first language. If the word string associations in the second language have an overlapping word (or alternatively words) the word string associations in the second language are combined (eliminating redundancies in the overlap) to form a translation; if not, other second language associations to the first language word strings are retrieved and tested for combination through an overlap of words until successful. The next word string in the document in first language is selected by finding the longest word string in the database that has an overlapping word (or alternatively words) with the previously identified first language word string, and the above process continued until the entire first language document is translated into a second language document.

The present invention also creates frequency tables to determine the association between two or more words or word strings so that the frequency tables may be utilized in other applications including those involved in converting content from one state to a second state. The frequency tables are created by examining documents in a given state (e.g., a given language) and determining the frequency at which two words and/or word strings are related based on the proximity to a word or word string in the text. Thus, for example, by examining texts in the English language frequency tables can be established for words or word strings related to the phrase "Mount Everest," such as "mountain," "highest place in the world," "snow," "climb," "people died," and "cold." These frequency tables may then be utilized in any number of ways in smart applications to answer questions by identifying common associations on two or more frequency tables. Databases created for smart applications can be built from documents in a single language (or alternatively using cross-language text).

BRIEF DESCRIPTION OF THE FIGURES

FIG. 1 shows an embodiment of a cross-idea database according to the present invention.

DETAILED DESCRIPTION OF THE INVENTION

The present invention provides a method and apparatus for creating and supplementing a cross-idea database and for translating documents from a first language or state into a second language or state using a cross-idea database. Documents as discussed herein are collections of information as ideas that are represented by symbols and characters fixed in some medium. For example, the documents can be electronic documents stored on magnetic or optical media, or paper documents, such as books. The symbols and characters contained in documents represent ideas and information expressed using one or more systems of expression intended to be understood by users of the documents. The present invention manipulates documents in a first state, i.e., containing information expressed in one system of expression, to produce documents in a second state, i.e., containing substantially the same information expressed using a second system of expression. Thus, the present invention can manipulate or translate documents between systems of expression, for example, written and spoken languages such as English, Hebrew, and Cantonese, into other languages.

Figure 2:
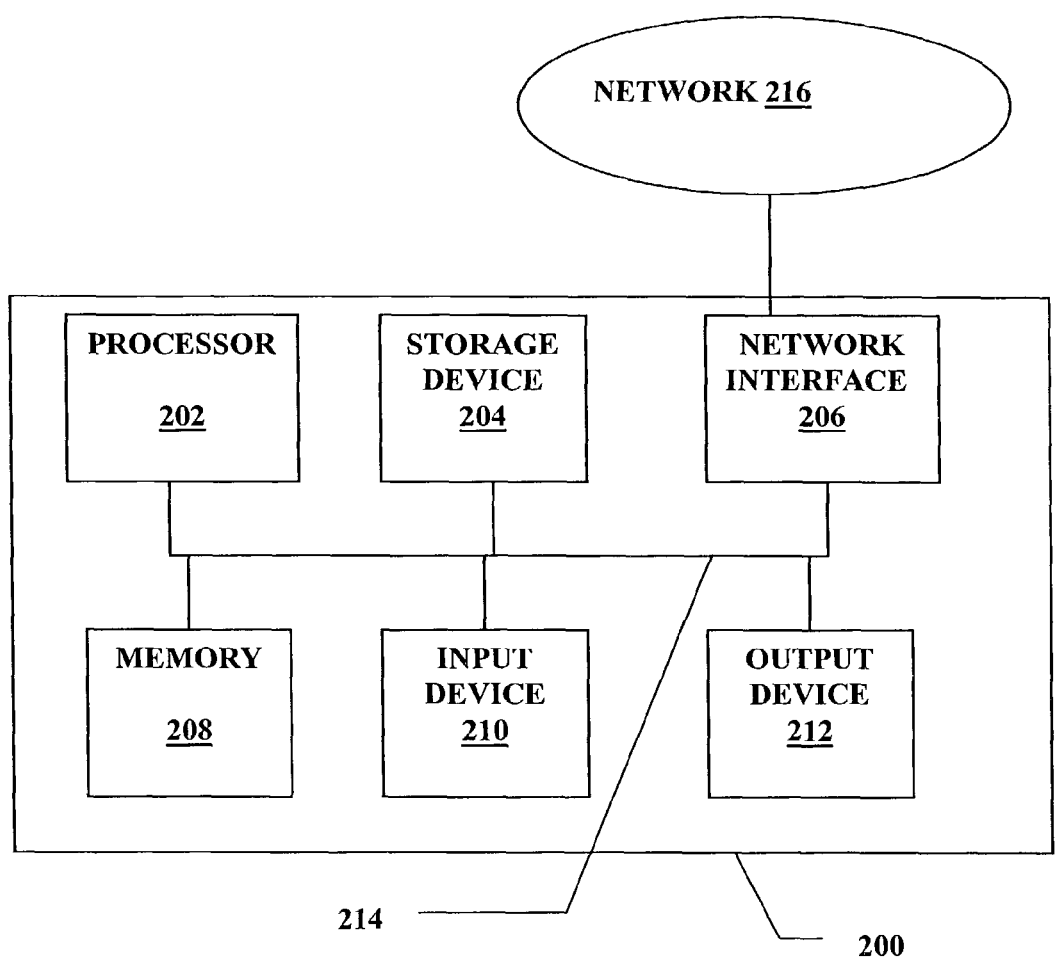
FIG. 2 shows an embodiment of a computer system of the present invention for implementing the methods of the present invention.

A system or apparatus for implementing the content conversion or content manipulation method of the present invention can be a computer system 200, shown in FIG. 2. The computer system 200 includes a processor 202 coupled via a bus 214 to a memory 208, an input device 210, and an output device 212. The computer system 200 can also include a storage device 204 and a network interface 206. The processor 202 accesses data and programs stored in the memory 208. By executing the programs in memory 208, the processor can control the computer system 200, and can carry out steps to manipulate data and to control devices including, for example, the input device 210, the output device 212, the storage device 204, the network interface 206, and the memory 208. Programs stored in memory 208 can include steps to perform the methods of the present invention such as content conversion, associating words and word strings, and database creation and supplementing methods.

The storage device 204 records and stores information for later retrieval by the memory 208 processor 202, and can include storage devices known in the art such as, for example, non-volatile memory devices, magnetic disc drives, tape drives, and optical storage devices. Storage device 204 can store programs and data, including databases that can be transferred to the memory 208 for use by the processor 202. Complete databases or portions of databases can be transferred to memory 208 for access and manipulation by the processor 202. The network interface 206 provides an interface between the computer system 200 and a network 216 such as the Internet, and transforms signals from the computer system 200 into a format that can be transmitted over the network 216, and vice versa. The input device 210, can include, for example, a keyboard and a scanner for inputting data into memory 208 and into the storage device 204. Input data can include text of documents to be stored in a document database for analysis and content conversion. The output device 212 includes devices for presenting information to a computer system user and can include, for example, a monitor screen and a printer.

A detailed description of the present invention, including the database creation method and apparatus, and the conversion method and apparatus, will now be described.

Database Creation Method and Apparatus

The method of the present invention makes use of a cross-idea database for document content manipulation. FIG. 1 depicts an embodiment of a cross-idea database. This embodiment of a cross-idea database comprises a listing of associated data segments in columns 1 and 2. The data segments are symbols or groupings of characters that represent a particular idea or piece of information in a system of expression. Where a system of expression in a document is a word language for example, a segment can be a word or a string of words. Thus, System A Segments in column 1 are data segments that represent various ideas and combination of ideas Da1, Da2, Da3 and Da4 in a hypothetical system of expression A. System B Segments in column 2 are data segments Db1, Db3, Db4, Db5, Db7, Db9, Db10 and Db12, that represent various ideas and some of the combinations of those ideas in a hypothetical system of expression B that are ordered by association frequency with data segments in system of expression A. Column 3 shows the Direct Frequency, which is the number of times the segment or segments in language B were associated with the listed segment (or segments) in language A. Column 4 shows the Frequencies after Subtraction, which represents the number of times a data segment (or segments) in language B has been associated with a segment (or segments) in language A after subtracting the number of times that segment (or segments) has been associated as part of a larger segment, as described more fully later.

As shown in FIG. 1, it is possible that a single segment, say Da1 is most appropriately associated with multiple segments, Db1 together with Db3 and Db4. The higher the Frequencies after Subtraction (as described herein) between data segments, the higher the probability that a system A segment is equivalent to a system B segment. In addition to measuring adjusted frequencies by total number of occurrences, the adjusted frequencies can also be measured, for example, by calculating the percentage of time that particular system A segments have corresponded to a particular system B segments. When the database is used to translate a document, the highest ranked associated segment will be retrieved from the database first in the process. Often, however, the method used to test the combination of associated segments for translation (as described later) determines that a different, lower ranked association should be tested because the higher ranked association, once tested, can not be used. For example, if the database was queried for an association for Da1, it would return Db1+Db3+Db4; if Db1+Db3+Db4 could not be used as determined by the process that accurately combines data segments for translation, the database would then return Db9+Db10 to test for accurate combination with another associated segment, for translation.

In general, the method for creating a cross-idea database of the present invention includes examining and operating on Parallel or Comparable Text. The method and apparatus of the present invention is utilized such that a database is created with associations across the two states—accurate conversions, or more specifically, associations between ideas as expressed in one state and ideas as expressed in another. The translation and other relevant associations between the two states become stronger, i.e. more frequent, as more documents are examined and operated on by the present invention, such that by operation on a large enough "sample" of documents the most common (and, in one sense, the correct) association becomes apparent and the method and apparatus can be utilized for conversion purposes.

In one embodiment of the present invention, the two states represent word languages (e.g., English, Hebrew, Chinese, etc.) such that the present invention creates a cross-language database correlating words and word-strings in one language to their translation counterparts in a second language. Word-strings may be defined as groups of consecutive adjacent words and often include punctuation and any other mark used in the expression of language. In this example, the present invention creates a database by examining documents in the two languages and creating a database of translations for each recurring word or word string in both languages. However, the present invention need not be limited to language translation. The present invention allows a user to create a database of ideas and associate those ideas to other, differing ideas in a hierarchical manner. Thus, ideas are associated with other ideas and rated according to the frequency of the occurrence. The specific weight given to the occurrence frequency, and the use applied to the database thus created, can vary depending upon the user's requirements.

For example, in the context of converting text from one language to another the present invention will operate to create language translations of words and word strings between the English and Chinese languages. The present invention will return a ranking of associations between words and word-strings across the two languages. Given a large enough sample size, the word or word-string occurring the most often will be one of the Chinese equivalents of the English word or word-string. However, the present invention will also return other Chinese language associations for the English words or word-strings, and the user may manipulate those associations as desired. For example, the word "mountain," when operated on according to the present invention may return a list of Chinese language words and word strings in the language being examined. The Chinese language equivalents of the word "mountain" will most likely be ranked the highest; however, the present invention will return other foreign language words or word-strings associated with "mountain," such as "snow", "ski", "a dangerous sport", "the highest point in the world", or "Mt. Everest." These words and word-strings, which will likely be ranked lower than the translations of "mountain," can be manipulated as desired by the user. Thus, the present invention is an automated association database creator. The strongest associations represent "translations" or "conversions" in one sense, but other frequent (but weaker) associations represent ideas that are closely related to the idea being examined. The databases can therefore, be used by systems using artificial intelligence applications that are well known in the art. Those systems currently use incomplete, manually created idea databases or ontologies as "neural networks" for applications. These databases of associated ideas for artificial intelligence applications can be built using any user-defined range from documents in a single language.

Another embodiment of the present invention utilizes a computing device such as a personal computer system of the type readily available in the prior art. Although the computing device is typically a common personal computer (either stand-alone or in a networked environment), other computing devices such as PDA's, wireless devices, servers, mainframes, and the like are similarly contemplated. However, the method and apparatus of the present invention does not need to use such a computing device and can readily be accomplished by other means, including manual creation of the cross-associations. The method by which successive documents are examined to enlarge the "sample" of documents and create the cross-association database is varied—the documents can be set up for analysis and manipulation manually, by automatic feeding (such as automatic paper loaders as known in the prior art), or by using search techniques on the Internet to automatically seek out the related documents such as Web Crawlers.

Note that the present invention can produce an associated database by examining Comparable Text, in addition to (or even instead of) Parallel Text. Furthermore, the method looks at all available documents collectively when searching for a recurring word or word-string within a language.

Building the Database

According to the present invention, the documents are examined for the purpose of building the database. After document input (again, of a pair of documents representing the same text in two different languages), the creation process begins using the methods and/or apparatus described herein.

For illustrative purposes, assume that the documents contain the same content (or, in a general sense, idea) in two different languages. Document A is in language A, Document B is in language B. The documents have the following text:

| Document A (language A) | Document B (language B) |
|---|---|
| X Y Z X W V Y Z X Z | AA BB CC AA EE FF GG CC |

The first step in the present invention is to calculate a word range to determine the approximate location of possible associations for any given word or word string. Since a cross-language word-to-word analysis alone will not yield productive results (i.e., word 1 in document A will often not exist as the literal translation of word 1 in document B), and the sentence structure of one language may have an equivalent idea in a different location (or order) of a sentence than another language, the database creation technique of the present invention associates each word or word-string in the first language with all of the words and word strings found in a selected range in the second language document. This is also important because one language often expresses ideas in longer or shorter word strings than another language. The range is determined by examining the two documents, and is used to compare the words and word-strings in the second document against the words and word-strings in the first document. That is, a range of words or word-strings in the second document is examined as possible associations for each word and word string in the first document. By testing against a range, the database creation technique establishes a number of second language words or word-strings that may equate and translate to the first language words and word-strings.

There are two attributes that must be determined in order to establish the range in the second language document in which to look for associations for any given word or word string in the first language document. The first attribute is the value or size of the range in the second document, measured by the number of words in the range. The second attribute is the location of the range in the second document, measured by the placement of the mid-point of the range. Both attributes are user defined, but examples of preferred embodiments are offered below. In defining the size and location of the range, the goal is to insure a high probability that the second language word or word-string translation of the first language segment being analyzed will be included.

Various techniques can be used to determine the size or value of the range including common statistical techniques such as the derivation of a bell curve based on the number of words in a document. With a statistical technique such as a bell curve, the range at the beginning and end of the document will be smaller than the range in the middle of the document. A bell-shaped frequency for the range allows reasonable chance of extrapolation of the translation whether it is derived according to the absolute number of words in a document or according to a certain percentage of words in a document. Other methods to calculate the range exist, such as a "step" technique where the range exists at one level for a certain percentage of words, a second higher level for another percentage of words, and a third level equal to the first level for the last percentage of words. Again, all range attributes can be user defined or established according to other possible parameters with the goal of capturing useful associations for the word or word string being analyzed in the first language.

The location of the range within the second language document may depend on a comparison between the number of words in the two documents. What qualifies as a document for range location purposes is user defined and is exemplified by news articles, book chapters, and any other discretely identifiable units of content, made up of multiple data segments. If the word count of the two documents is roughly equal, the location of the range in the second language will roughly coincide with the location of the word or word-string being analyzed in the first language. If the number of the words in the two documents is not equal, then a ratio may be used to correctly position the location of the range. For example, if document A has 50 words and document B has 100 words, the ratio between the two documents is 1:2. The mid-point of document A is word position 25. If word 25 in document A is being analyzed, however, using this mid-point (word position 25) as the placement of the midpoint of the range in document B is not effective, since this position (word position 25) is not the midpoint of document B. Instead, the midpoint of the range in document B for analysis of word 25 in document A may be determined by the ratio of words between the two documents (i.e., 25×2/1=50), by manual placement in the mid-point of document B or by other techniques.

By looking at the position of a word or word-string in the document and noting all the word or word strings that fall within the range as described above, the database creation technique of the present invention returns a possible set of words or word-strings in the second-language document that may translate to each word or word-string in the first document being analyzed. As the database creation technique of the present invention is utilized, the set of words and word strings that qualify as possible translations will be narrowed as association frequencies develop. Thus, after examining a pair of documents, the present invention will create association frequencies for words and word strings in one language with words or word strings in a second language. After a number of document pairs are examined according to the present invention (and thus a large sample created), the cross-language association database creation technique will return higher and higher association frequencies for any one word or word string. After a large enough sample, the highest association frequencies result in possible translations; of course, the ultimate point where the association frequency is deemed to be an accurate translation is user defined and subject to other interpretive translation techniques (such as those described in Provisional Application No. 60/276,107, entitled "Method and Apparatus for Content Manipulation" filed on Mar. 16, 2001 and incorporated herein by reference).

As indicated above, the invention tests not only words but also strings of words (multiple words). As mentioned, word strings include all punctuation and other marks as they occur. After a single word in a first language is analyzed, the database creation technique of the present invention analyzes a two-word word string, then three-word word string, and so on in an incremental manner. This technique makes possible the translation of words or word strings in one language that translate into a shorter or longer word-string (or word) in another language, as often occurs. If a word or word-string only occurs once in all available documents in the first language, the process immediately proceeds to analyze the next word or word string, where the analysis cycle occurs again. The analysis stops when all word or word strings that have multiple occurrences in the first language in all available Parallel and Comparable Text have been analyzed.

In a sense, any number of documents are aggregated and can be treated as one single document for purposes of looking for recurring of words or word strings. In essence, for a word or word-string not to repeat it would have to occur only once in all available Parallel and Comparable Text. In addition, as another embodiment it is possible to examine the range corresponding to every word and word string regardless of whether or not it occurs more than once in all available Comparable and Parallel Text. As another embodiment, the database can be built by resolving specific words and word strings that are part of a query. When words and word strings are entered for translation, the present invention can look for multiple occurrences of the words or word-strings in cross-language documents stored in memory that have not yet been analyzed, by locating cross-language text on the Internet using web-crawlers and other devices and, finally, by asking the user to supply a missing association based on the analysis of the query and the lack of sufficiently available cross-language material.

The present invention thus operates in such a manner so as to analyze word strings that depend on the correct positioning of words (in that word string), and can operate in such a manner so as to account for context of word choice as well as grammatical idiosyncrasies such as phrasing, style, or abbreviations. These word string associations are also useful for the double overlap translation technique that provides the translation process as described herein.

It is important to note, that the present invention can accommodate situations where a subset word or word string of a larger word string is consistently returned as an association for the larger word string. The present invention accounts for these patterns by manipulating the frequency return. For example, proper names are sometimes presented complete (as in "John Doe"), abbreviated by first or surname ("John" or "Doe"), or abbreviated by another manner ("Mr. Doe"). Since the present invention will most likely return more individual word returns than word string returns (i.e., more returns for the first or surnames rather than the full name word string "John Doe"), because the words that make up a word string will necessarily be counted individually as well as part of the phrase, a mechanism to change the ranking should be utilized. For example, in any document the name "John Doe" might occur one hundred times, while "John" by itself or as part of John Doe might occur one hundred-twenty times, and "Doe" by itself or as part of John Doe might occur one hundred-ten times. The normal translation return (according to the present invention) will rank "John" higher than "Doe," and both of those words higher than the word string "John Doe"—all when attempting to analyze the word string "John Doe." By subtracting the number of occurrences of the larger word string from the occurrences of the subset (or individual returns) the proper ordering may be accomplished (although, of course, other methods may be utilized to obtain a similar result). Thus, subtracting one hundred (the number of occurrences for "John Doe"), from one hundred twenty (the number of occurrences for the word "John"), the corrected return for "John" is twenty. Applying this analysis yields one-hundred as the number of occurrences for the word string "John Doe" (when analyzing and attempting to translate this word string), twenty for the word "John," and ten for the word string "Doe," thus creating the proper associations.

Note that this issue is not limited to proper names and often occurs in common phrases and in many different contexts. For example, every time the word-string "I love you" is translated to its most frequent word-string association in another language, the word for "love" in that other language may be associated independently each of those times as well. Additionally, when the word-string is translated differently in other text that is analyzed, the word "love" may again be associated. This will skew the analysis and return the word "love" in the second language instead of "I love you" in the second language for the translation of "I love you" in the first language. Therefore, once again, the system subtracts the number of occurrences of the larger word-string association, from the frequency of all subset associations when ranking associations for the larger string. These concepts are also reflected in FIG. 1.

Additionally, the database can be instructed to ignore common words such as "it", "an", "a", "of", "as", "in", and the like—or any common words when counting association frequencies for words and word-strings. This will more accurately reflect the true association frequency numbers that will otherwise be skewed by the numerous occurrences of common words as part of any given range. This allows the association database creation technique of the present invention to prevent common words from skewing the analysis without excessive subtraction calculations. It should be noted that if these or any other common words are not "subtracted" out of the association database, they would ultimately not be approved as a translation, unless appropriate, because the double overlap process described in more detail herein would not accept it.

It should be noted that other calculations to adjust the association frequencies could be made to insure the accurate reflection of the number of common occurrences of word and word strings. For example, an adjustment to avoid double counting may be appropriate when the ranges of analyzed words overlap. Adjustments are desirable in these cases to build more accurate association frequencies. An example of an embodiment of the method and apparatus for creating and supplementing a cross-idea database according to the present invention will now be described using the two documents described above as an example—the table is re-created as follows:

TABLE 1

| Document A (language A) | Document B (language B) |
|---|---|
| X Y Z X W V Y Z X Z | AA BB CC AA EE FF GG CC |

Note once again that although this embodiment focuses on recurring words and word-strings in only a single document, this is mainly for illustrative purposes. Recurring words and word-strings will be analyzed using all available Parallel and Comparable Text in the aggregate.

Using the two documents listed above (A, the first language and B, the second language), the following steps occur for the database creation technique.

Step 1. First, the size and location of the range is determined. As indicated, the size and location may be user defined or may be approximated by a variety of methods. The word count of the two documents is approximately equal (ten words in document A, eight words in document B) therefore we will locate the mid-point of the range to coincide with the location of the word or word string in the document A. (Note: As the ratio of word counts between the documents is 80%, the location of the range alternatively could have been established applying a fraction ⅘ths). In this example, a range size or value of three may provide the best results to approximate a bell curve; the range will be (+/−) 1 at the beginning and end of the document, and (+/−) 2 in the middle. However, as indicated, the range (or the method used to determine the range) is entirely user defined.

Step 2. Next, the first word in document A is examined and tested against document A to determine the number of occurrences of that word in the document. In this example the first word in document A is X: X occurs three times in document A, at positions 1, 4, and 9. The position numbers of a word or word string are simply the location of that word, or word string in the document relative to other words. Thus, the position numbers correspond to the number of words in a document, ignoring punctuation—for example, if a document has ten words in it, and the word "king" appears twice, the position numbers of the word "king" are merely the places (out of ten words) where the word appears.

Because word X occurs more than once in the document, the process proceeds to the next step. If word X only occurred once, then that word would be skipped and the process continued to the next word and the creation process continued.

Step 3. Possible second language translations for first language word X at position 1 are returned: applying the range to document B yields words at positions 1 and 2 (1+/−1) in document B: AA and BB (located at positions 1 and 2 in document B). All possible combinations are returned as potential translations or relevant associations for X: AA, BB, and AA BB (as a word string combination). Thus, X1 (the first occurrence of word X) returns AA, BB, and AA BB as associations.

Step 4. The next position of word X is analyzed. This word (X2) occurs at position 4. Since position 4 is near the center of the document, the range (as determined above) will be two words on either side of position 4. Possible associations are returned by looking at word 4 in document B and applying the range (+/−) 2—hence, two words before word 4 and two words after word 4 are returned. Thus, words at positions 2, 3, 4, 5, and 6 are returned. These positions correspond to words BB, CC, AA, EE, and FF in document B. All forward permutations of these words (and their combined word strings) are considered Thus, X2 returns BB, CC, AA, EE, FF, BB CC, BB CC AA, BB CC AA EE, BB CC AA EE FF, CC AA, CC AA EE, CC AA EE FF, AA EE, AA EE FF, and EE FF as possible associations.

Step 5. The returns of the first occurrence of X (position 1) are compared to the returns of the second occurrence of X (position 4) and matches are determined. Note that returns which include the same word or word string occurring in the overlap of the two ranges should be reduced to a single occurrence. For example, in this example the word at position 2 is BB; this is returned both for the first occurrence of X (when operated on by the range) and the second occurrence of X (when operated on by the range). Because this same word position is returned for both X1 and X2, the word is counted as one occurrence. If, however, the same word is returned in an overlapping range, but from two different word positions, then the word is counted twice and the association frequency is recorded. In this case the returns for word X is AA, since that word (AA) occurs in both association returns for X1 and X2. Note that the other word that occurs in both association returns is BB; however, as described above, since that word is the same position (and hence the same word) reached by the operation of the range on the first and second occurrences of X, the word can be disregarded.

Step 6. The next position of word X (position 9) (X3) is analyzed. Applying a range of (+/−) 1 (near the end of the document) returns associations at positions 8, 9 and 10 of document B. Since document B has only 8 positions, the results are truncated and only word position 8 is returned as possible values for X: CC. (Note: alternatively, user defined parameters could have called for a minimum of two characters as part of the analysis that would have returned position 8 and the next closest position (which is GG in position 7)).

Comparing X3's returns to X1's returns reveals no matches and thus no associations.

Step 7. The next position of word X is analyzed; however, there are no more occurrences of word X in document A. At this point an association frequency of one (1) is established for word X in Language A, to word AA in Language B.

Step 8. Because no more occurrences of word X occur, the process is incremented by a word and a word string is tested. In this case the word string examined is "X Y", the first two words in document A. The same technique described in steps 2-7 are applied to this phrase.

Step 9. By looking at document A, we see that there is only one occurrence of the word string X Y. At this point the incrementing process stops and no database creation occurs. Because an end-point has been reached, the next word is examined (this process occurs whenever no matches occur for a word string); in this case the word in position 2 of document A is "Y".

Step 10. Applying the process of steps 2-7 for the word "Y" yields the following:

Two occurrences of word Y (positions 2 and 7) exist, so the database creation process continues (again, if Y only occurred once in document A, then Y would not be examined);

The size of the range at position 2 is (+/−) 1 word;

Application of range to document B (position 2, the location of the first occurrence of word Y) returns results at positions 1, 2, and 3 in document B;

The corresponding foreign language words in those returned positions are: AA, BB, and CC;

Applying forward-permutations yields the following possibilities for Y1: AA, BB, CC, AA BB, AA BB CC, and BB CC;

The next position of Y is analyzed (position 7);

The size of the range at position 7 is (+/−) 2 words;

Application of that range to document B (position 7) returns results at positions 5, 6, 7, and 8: EE FF GG and CC;

All permutations yield the following possibilities for Y2: EE, FF, GG, CC, EE FF, EE FF GG, EE FF GG CC, FF GG, FF GG CC, and GG CC;

Matching results from Y1 returns CC as the only match;

Combining matches for Y1 and Y2 yields CC as an association frequency for Y.

Step 11. End of range incrementation: Because the only possible match for word Y (word CC) occurs at the end of the range for the first occurrence of Y (CC occurred at position 3 in document B), the range is incremented by 1 at the first occurrence to return positions 1, 2, 3, and 4: AA, BB, CC, and AA; or the following forward permutations: AA, BB, CC, AA BB, AA BB CC, AA BB CC AA, BB CC, BB CC AA, and CC AA. Applying this result still yields CC as a possible translation for Y. Note that the range was incremented because the returned match was at the end of the range for the first occurrence (the base occurrence for word "Y"); whenever this pattern occurs an end of range incrementation will occur as a sub-step (or alternative step) to ensure completeness.

Step 12. Since no more occurrences of "Y" exist in document A, the analysis increments one word in document A and the word string "Y Z" is examined (the next word after word Y). Incrementing to the next string (Y Z) and repeating the process yields the following:

Word string Y Z occurs twice in document A: position 2 and 7 Possibilities for Y Z at the first occurrence (Y Z1) are AA, BB, CC, AA BB, AA BB CC, BB CC; (Note, alternatively the range parameters could have been defined to include the expansion of the size of the range as word strings being analyzed in language A get longer.)

Possibilities for Y Z at the second occurrence (Y Z2) are EE, FF, GG, CC, EE FF, EE FF GG, EE FF GG CC, FF GG, FF GG CC, and GG CC;

Matches yield CC as a possible association for word string Y Z;

Extending the range (the end of range incrementation) yields the following for Y Z: AA, BB, CC, AA BB, AA BB CC, AA BB CC AA, BB CC, BB CC AA, and CC AA.

Applying the results still yields CC as an association frequency for word string Y Z.

Step 13. Since no more occurrences of "Y Z" exist in document A, the analysis increments one word in document A and the word string "Y Z X" is examined (the next word after word Z at position 3 in document A). Incrementing to the next word string (Y Z X) and repeating the process (Y Z X occurs twice in document A) yields the following:

Returns for first occurrence of Y Z X are at positions 2, 3, 4, and 5;

Permutations are BB, CC, AA, EE, BB CC, BB CC AA, BB CC AA EE, CC AA, CC AA EE, and AA EE;

Returns for second occurrence of Y Z X are at positions 5, 6, 7, and 8;

Permutations are EE, FF, GG, CC, EE FF, EE FF GG, EE FF GG CC, FF GG, FF GG CC, and GG CC.

Comparing the two yields CC as an association frequency for word string Y Z X; again, note that the return of EE as a possible association is disregarded because it occurs in both instances as the same word (i.e., at the same position).

Step 14. Incrementing to the next word string (Y Z X W) finds only one occurrence; therefore the word string database creation is completed and the next word is examined: Z (position 3 in document A).

Step 15. Applying the steps described above for Z, which occurs 3 times in document A, yields the following:

Returns for Z1 are: AA, BB, CC, AA, EE, AA BB, AA BB CC, AA BB CC AA, AA BB CC AA EE, BB CC, BB CC AA, BB CC AA EE, CC AA, CC AA EE, and AA EE;

Returns for Z2 are: FF, GG, CC, FF GG, FF GG CC, and GG CC;

Comparing Z1 and Z2 yields CC as an association frequency for Z;

Z3 (position 10) has no returns in the range as defined. However, if we add to the parameters that there must be a least one return for each language A word or word string, the return for Z will be CC.

Comparing the returns for Z3 with Z1 yields CC as an association frequency for word Z. However, this association is not counted because CC in word position 8 was already accounted in Z2's association above. When an overlapping range would cause the process to double count an occurrence, the system can reduce the association frequency to more accurately reflect for the number of true occurrences.

Step 16. Incrementing to the next word string yields the word string Z X, which occurs twice in document A. Applying the steps described above for Z X yields the following:

Returns for Z X1 are: BB, CC, AA, EE, FF, BB CC, BB CC AA, BB CC AA EE, BB CC AA EE FF, CC AA, CC AA EE, CC AA EE FF, AA EE, AA EE FF, and EE FF.

Returns for Z X2 are: FF, GG, CC, FF GG, FF GG CC, and GG CC;

Comparing the returns yields the association between word string Z X and CC.

Step 17. Incrementing, the next phrase is Z X W. This occurs only once, so the next word (X) in document A is examined.

Step 18. Word X has already been examined in the first position. However, the second position of word X, relative to the other document, has not been examined for possible returns for word X. Thus word X (in the second position) is now operated on as in the first occurrence of word X, going forward in the document:

Returns for X at position 4 yield: BB, CC, AA, EE, FF, BB CC, BB CC AA, BB CC AA EE, BB CC AA EE FF, CC AA, CC AA EE, CC AA EE FF, AA EE, AA EE FF, and EE FF.

Returns for X at position 9 yield: CC.

Comparison of the results of position 9 to results for position 4 yields CC as a possible match for word X and it is given an association frequency.

Step 19. Incrementing to the next word string (since, looking forward in the document, no more occurrences of X occur for comparison to the second occurrence of X) yields the word string XW. However, this word string does not occur more than once in document A so the process turns to examine the next word (W). Word "W" only occurs once in document A, so incrementation occurs—not to the next word string, since word "W" only occurred once, but to the next word in document A—"V". Word "V" only occurs once in document A, so the next word (Y) is examined. Word "Y" does not occur in any other positions higher than position 7 in document A, so next word (Z) is examined. Word "Z" occurs again after position 8, at position 10.

Step 20. Applying the process described above for the second occurrence of word Z yields the following:

Returns for Z at position 8 yields: GG, CC, and GG CC;

Returns for Z at position 10 yields: CC;

Comparing results of position 10 to position 8 yields no associations for word Z.

Again, word CC is returned as a possible association; however, since CC represents the same word position reached by analyzing Z at position 8 and Z at position 10, the association is disregarded.

Step 21. Incrementing by one word yields the word string Z X; this word string does not occur in any more (forward) positions in document A, so the process begins anew at the next word in document A—"X". Word X does not occur in any more (forward) positions of document A, so the process begins anew. However, the end of document A has been reached and the analysis stops.

Step 22. The final association frequency is tabulated combining all the results from above and subtracting out duplications as explained.

Obviously, there is insufficient data to return conclusive results for words and word-strings in document A. As more document pairs are examined containing words and word strings with those associations examined above, the association frequencies will become statistically more reliable such that words or word strings between Languages A and B will build strong associations for possible translations of words and word-strings.

Program1, set forth in the computer program listing appendix, is an example of a program for implementing an embodiment of the database creation method. Program1 can be executed on a computer system of the type known in the art.

As demonstrated, this embodiment is representative of the technique used to create associations. The techniques of the present invention need not be limited to language translation. In a broad sense, the techniques will apply to any two expressions of the same idea that may be associated, for at its essence foreign language translation merely exists as a paired associations of the same idea represented by different words or word strings. Thus, the present invention may be applied to associating data, sound, music, video, or any wide ranging concept that exists as an idea, including ideas that can represent any sensory (sound, sight, smell, etc.) experiences. All that is required is that the present invention analyzes two embodiments (in language translation, the embodiments are documents; for music, the embodiments might be digital representations of a music score and sound frequencies denoting the same composition, and the like).

In another embodiment, certain rule-based algorithms, well known in the art, can be incorporated into the cross-language association learning to treat certain classes of text that are, for purposes of context and meaning, interchangeable (and sometimes can have potentially infinite derivations) such as names, numbers and dates.

In addition, if available cross-language documents do not furnish statistically significant results for translation, users can examine the possible choices for translations and other associations and approve and rank appropriate choices.

As described, the association frequencies get stronger between words and word-strings as more documents in translated pairs are analyzed for association frequencies. As documents in more language pairs are examined, the method and apparatus of the present invention will begin filling in "deduced associations" between language pairs based on those languages having a common association with a third language, but not directly with one another. In addition, when translated documents exist in multiple languages, common association returns can be analyzed across several languages until only one common association exists between all, which is the translation. Program2, set forth in the computer program listing appendix is an example of a computer program that, when operated in conjunction with a computer system of the type known in the art, provides a method where data in these languages is utilized in an embodiment of the present invention.

Also, if expressions in existing states are artificially attributed specific associations with data points in another state and catalogued in a database, conversions between those two states will be possible. For example, if each "idea" represented in a form, state, or language is assigned an association to an electromagnetic wave (tone), it will create an "electromagnetic representation" of the idea. Once a given number of ideas have been encoded with corresponding electromagnetic representations, data (in the form of an idea) can be translated into electromagnetic waves and transferred at once over conventional telecommunications infrastructure. When the electromagnetic waves reach the destination machine, that machine will synthesize the waves into separate components and, given the associations (along with ordering instructions, use of the double overlap technique as described herein, and/or other possible methods), present the individual ideas that were represented by the electromagnetic representations.

Idea Conversion Method and Apparatus

Another aspect of the present invention is directed to providing a method and apparatus for creating a second document comprising data in a second state, form, or language, from a first document comprising data in a first state, form, or language, with the end result that the first and second documents represent substantially the same ideas or information, and wherein the method and apparatus includes using a cross-idea association database. All embodiments of the translation method utilize a double-overlap technique to obtain an accurate translation of ideas from one state to another. In contrast, prior art translation devices focus on individual word translation or utilize special rule-based codes to facilitate the translation from a first language into a second language. The present invention, using the overlap technique, enables words and word strings in a second language to be connected together organically and become accurate translations in their correct context in the exact manner those words and phrases would have been written in the second language.

In an embodiment of the present invention, the method for database creation and the overlap technique are combined to provide accurate language translation. The languages can be any type of conversion and are not necessarily limited to spoken/written languages. For example, the conversion can encompass computer languages, specific data codes such as ASCII, and the like. The database is dynamic; i.e., the database grows as content is input into the translation system, with successive iterations of the translation system using content entered at a previous time. The preferred embodiment of the invention utilizes a computing device such as a personal computer system of the type readily available in the prior art. However, the system does not need to use such a computing device and can readily be accomplished by other means, including manual creation of the database and translation methods.

The present invention may be utilized on a common computer system having at least a display means, an input method, and output method, and a processor. The display means can be any of those readily available in the prior art, such as cathode ray terminals, liquid crystal displays, flat panel displays, and the like. The processor means also can be any of those readily available and used in a computing environment such that the means is supplied to allow the computer to operate to perform the present invention. Finally, an input method is utilized to allow the input of the documents for the purposes of building the cross-association database; as described above the specific input method for conversion to digital form can vary depending on the needs of the user.

Manual Database Creation and Translation Through Double-Overlap Technique

An example of an embodiment of the method and apparatus for translating a document from a first language into a second language according to the present invention, where the cross language database is developed by querying the user for translations of words and word strings, as well as automatically generating segment translations using the double overlap technique, will now be described.

For the purposes of describing the preferred embodiment, an example will be used wherein data in the English language is translated to data in the Hebrew language. These selections are for descriptive purposes only and are not meant to limit the selection of a first and second language.

According to a preferred embodiment of the present invention, the computer system operates to create a database of associations between translations from English to Hebrew. The translation method encompasses at least the following steps:

First, data in the English language is input into the computer system.

Second, all words of the English language input are first examined on a word by word basis. The database will return known word translations in Hebrew. If the translation is not included in the database, then the computer system will operate in a manner to query the user to input the appropriate translation. Thus, if the database does not know the Hebrew equivalent to an input English word, the computer will ask the user to provide the appropriate Hebrew equivalent. The user will then return the translation and input said translation into the database. Upon subsequent use, the computer system will operate the database in a manner such that the translation is known by virtue of its input by the user at an earlier point in time. Thus, in a second step the input data is examined in its parsed state—e.g., word for word—and the appropriate translations are either returned (by virtue of the operation of the database) or entered into the database.

Third, the input data is examined in a manner so as to increment the parsed segments. For example, if the data was first parsed on a word-by-word basis, the translation method of the present invention next examines the input data by evaluating two word-strings. Again, in a manner similar to that described above, the database returns translations for the two-word strings if known; if unknown the translation system operates to query the user to input the appropriate translation for all possible two word strings. All overlapping 2 word segments are then stored in the database. For example, if a word string is comprised of four words, then the database checks to see if it has the following combinations translated in memory: 1,2 2,3 and 3,4. If not, it queries the user. Note that only specifically encoded translations for the two word strings will be returned as accurate translations, even though the database will necessarily contain each word definition by virtue of the second step above.

Fourth, if the Hebrew translations of two overlapping two-word English language strings have an overlapping word (or words), the system operates in a manner to combine the overlapped segments. Redundant Hebrew segments in the overlap are eliminated to provide a coherent translation of the three-word English language string that is created by combining the two overlapping English language strings (and eliminating redundancies in the English language overlap). The above steps are reiterated out from 1 to an infinite number of steps (n) so as to provide the appropriate translation. The translation method works automatically by verifying consistent strings that bridge encoded word-blocks in both languages through the overlap. These automatic approvals for overlap-bridges that are consistent across both languages provide a language network that translates between two languages with perfect accuracy once the database reaches critical mass.

As an example, consider the English language phrase "I want to buy a car." Upon operation of a method of the present invention, this phrase will be input into a computer operating a database. The computer will operate to determine if the database includes Hebrew equivalents to the following words: "I", "want", "to", "buy", "a", and "car". If such equivalents are known, the computer will return the Hebrew equivalents. If such equivalents are not known, the computer will query the user to provide the appropriate Hebrew translations, and store such translations for future use. Next, the computer will parse the sentence into two word segments in an overlapping manner: "I want", "want to", "to buy", "buy a" and "a car". The computer will operate to return the Hebrew equivalents of these segments (i.e., the Hebrew equivalent of "I want" etc.); if such Hebrew equivalents are not known then the computer will query the user to provide the appropriate Hebrew translations, and store such translations for future use.

The present invention will next examine three-word segments "I want to", "want to buy", "to buy a", and "buy a car". At this point in the process the present invention attempts to combine each pair of Hebrew translations whose two-word English translations overlap and combine to make each three-word English translation query (e.g., "I want" and "want to" combine to form "I want to"). If the Hebrew segments have a common overlap that connects them as well, the translation method automatically approves the three-word English word string to Hebrew as a translation without any user intervention. If the Hebrew segments do not overlap and combine, the user is queried for an accurate translation. After the appropriate translation attempts for three word English strings, the process proceeds with four-word strings, and so on, attempting to automatically resolve, through the cross-language overlap, combinations of translations until the segment being examined is complete (in this case, the entire phrase "I want to buy a car"). The method of the present invention, after going through this parsing, then compares the returned translation equivalents, eliminates redundancies in the overlapped segments, and outputs the translated phrase to the user.

Document Translation through Association Database and Double Overlap Technique

As another preferred embodiment, the present invention can translate a document in a first language into a document in a second language by using a cross-language database as described above to provide word-string translations of words and word-strings in the document, and then combine overlapping word-strings in the second language to provide the translation of the document, using the cross-language double-overlap technique described above. For example, consider a database with access to enough cross-language documents to resolve the components of the following sentence entered in English and intended to be translated into Hebrew: "In addition to my need to be loved by all the girls in town, I always wanted to be known as the best player to ever play on the New York state basketball team."

Through the process described above, the manipulation method might determine that the phrase "In addition to my need to be loved by all the girls" is the largest word-string from the source document beginning with the first word of the source document and existing in the database. It is associated in the database to the Hebrew word string "benosaf ltzorech sheli lihiot ahuv al yeday kol habahurot." The process will then determine the following translations using the method described above—i.e. the largest English word string from the text to be translated (and exists in the database) with one word (or alternatively more words) that overlap with the previously identified English word string, and the two Hebrew language translations for those overlapping English language word strings have overlapping segments as well: "loved by all the girls in town" translates to "ahuv al yeday kol habahurot buir"; "the girls in town, I always wanted to be known" translates to "Habahurot buir, tamid ratzity lihiot yahua"; "I always wanted to be known as the best player" translates to "tamid ratzity lihiot yahua better hasahkan hachi tov"; and "the best player to ever play on the New York state basketball team" translates to "hasahkan hachi tov sh hay paam sihek bekvutzat hakadursal shel medinat new york".

With these returns by the database, the manipulation will operate in a manner to compare overlapping word and word strings and eliminate redundancies. Thus, "In addition to my need to be loved by all the girls" translates to "benosaf ltzorech sheli lihiot ahuv al yeday kol habahurot"; and "loved by all the girls in town" translates to "ahuv al yeday kol habahurot buir". Utilizing the technique of the present invention, the system will take the English segments "In addition to my need to be loved by all the girls" and "loved by all the girls in town" and will return the Hebrew segments "benosaf ltzorech sheli lihiot ahuv al yeday kol habahurot" and "ahuv al yeday kol habahurot buir" and determine the overlap.

In English, the phrases are:
"In addition to my need to be loved by all the girls" and "loved by all the girls in town". Removing the overlap yields: "In addition to my need to be loved by all the girls in town".

In Hebrew, the phrases are:
"benosaf ltzorech sheli lihiot ahuv al yeday kol habahurot" and "ahuv al yeday kol habahurot buir" Removing the overlap yields: "benosaf ltzorech sheli lihiot ahuv al yeday kol habahurot buir"

The present invention then operates on the next parsed segment to continue the process. In this example, the manipulation process works on the phrase "the girls in town, I always wanted to be known". The system resolves the English segment "In addition to my need to be loved by all the girls in town" and the new English word set "the girls in town, I always wanted to be known". The Hebrew corresponding word sets are "benosaf ltzorech sheli lihiot ahuv al yeday kol habahurot buir" and the Hebrew corresponding word set "habahurot buir, tamid ratzity lihiot yahua". Removing the overlap operates, in English, as follows: "In addition to my need to be loved by all the girls in town" and "the girls in town, I always wanted to be known" to "In addition to my need to be loved by all the girls in town, I always wanted to be known".

In Hebrew, the overlap process operates as follows:
"benosaf ltzorech sheli lihiot ahuv al yeday kol habahurot buir" and "habahurot buir, tamid ratzity lihiot yahua" yields "benosaf ltzorech sheli lihiot ahuv al yeday kol habahurot buir, tamid ratzity lihiot yahua".

The present invention continues this type of operation with the remaining words and word strings in the document to be translated. Thus, in an example of the preferred embodiment, the next English word strings are "In addition to my need to be loved by all the girls in town, I always wanted to be known" and "I always wanted to be known as the best player". Hebrew translations returned by the database for these phrases are: "benosaf ltzorech sheli lihiot ahuv al yeday kol habahurot buir, tamid ratzity lihiot yahua" and "tamid ratzity lihiot yahua better hasahkan hachi tov". Removing the English overlap yields: "In addition to my need to be loved by all the girls in town, I always wanted to be known as the best player". Removing the Hebrew overlap yields:
"benosaf ltzorech sheli lihiot ahuv al yeday kol habahurot buir, tamid ratzity lihiot yahua better hasahkan hachi tov"

Continuing the process: the next word string is "In addition to my need to be loved by all the girls in town, I always wanted to be known as the best player" and "the best player to ever play on the New York State basketball team". The corresponding Hebrew phrases are "benosaf ltzorech sheli lihiot ahuv al yeday kol habahurot buir, tamid ratzity lihiot yahua better hasahkan hachi tov" and "hasahkan hachi tov sh hay paam sihek bekvutzat hakadursal shel medinat new york". Removing the English overlap yields: "In addition to my need to be loved by all the girls in town, I always wanted to be known as the best player to ever play on the New York state basketball team". Removing the Hebrew overlap yields: "benosaf Itzorech sheli lihiot ahuv al yeday kol habahurot buir, tamid ratzity lihiot yahua better hasahkan hachi tov sh hay paam sihek bekvutzat hakadursal shel medinat new york", which is the translation of the text desired to be translated.

Upon the completion of this process, the present invention operates to return the translated final text and output the text.

It should be noted that the returns were the ultimate result of the database returning overlapping associations in accordance with the process described above. The system, through the process, will ultimately not accept a return in the second language that does not have a naturally fitting connection with the contiguous second language segments through an overlap. Had any Hebrew language return not had an exact overlap with a contiguous Hebrew word-string association, it would have been rejected and replaced with a Hebrew word-string association that overlaps with the contiguous Hebrew word-strings.

Program3, set forth in the computer program listing appendix, is an example of a program for implementing an embodiment of the manual database creation and translation using the double-overlap technique. Program3 can be executed on a computer system of the type known in the art.

The above embodiment combining the use of a cross-language association database and the cross-language double overlap translation technique has other potential applications to improve the quality of existing technologies that attempt to equate information from one state to another, such as voice recognition software, and OCR scanning devices that are known in the art. Both of these technologies can test the results of their systems against the translation methods of the present invention. When a translation does not exist and therefore a mistake is presumed, the user can be alerted and queried or the system can be programmed to look for close alternatives in the database to the un-overlapped translation that will produce an overlapped translation. All returns to the user, of course, would be converted back into the original language.

Figure 3:
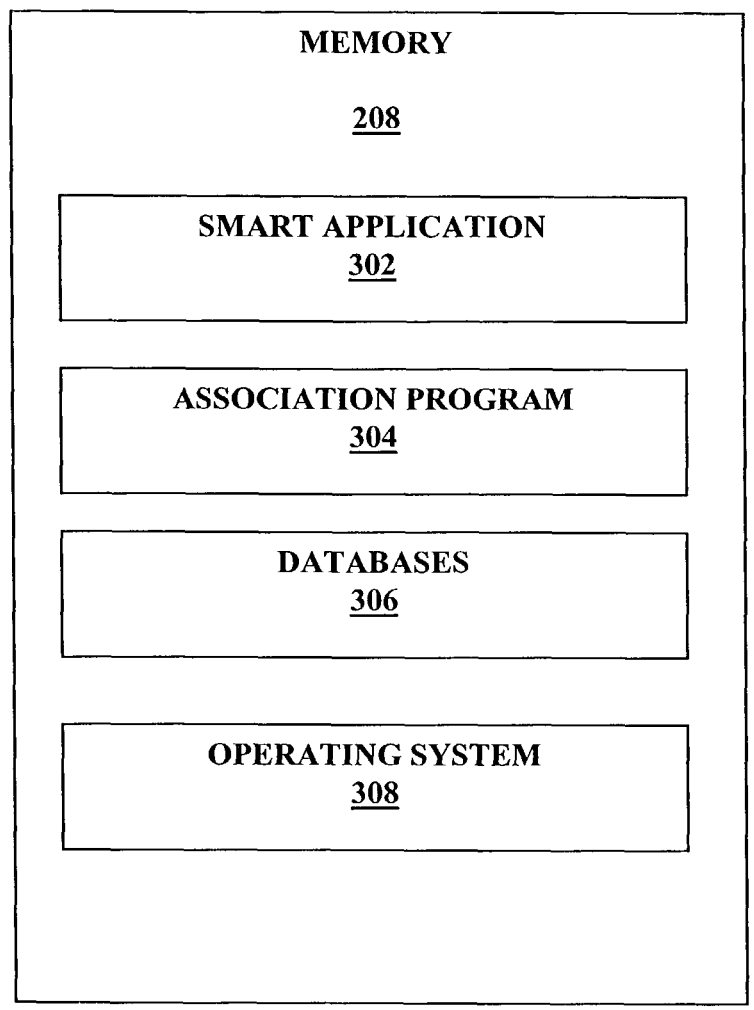
FIG. 3 shows a memory device of the computer system of the present invention containing programs for implementing the methods of the present invention.

Another embodiment of the present invention provides a method and apparatus for creating an association database within a single language and a method and system for using the association database to provide answers to queries or questions posed by users. In this embodiment, the association database can organize and store information that permits the determination and analysis of associations between words or word strings. An association program can embody some of the methods of the present invention and can be used to build the databases of the present invention and to analyze the information stored in the databases to determine associations between words or word strings. FIG. 3 depicts memory 208 of the computer system 200 in which are stored a smart application 302, an association program 304, databases 306 and an operating system 308, for access by processor 202. The association program 304 can be an independent program or can form an integral part of a smart application 302. The association program 304, can analyze the databases 306 to determine word associations either in response to a query from a smart application 302, or in response to a query directly submitted by the user via the input device.

The system and method operates by parsing text of a document input into the system and creating a frequency association database in which segments of the parsed text are associated with one another, based on, for example, the frequency of occurrence and position of a particular fragment with respect to other fragments of the document. Segments of parsed text can include words and word strings. Documents used in the present invention can be stored in a Document Database to facilitate access, parsing, and analysis of the documents.

Words and word strings that frequently appear in close proximity to each other within a document can be used in artificial intelligence or smart applications which allow a user to ask the system to answer a question or perform an action. The purpose for using the association databases of the present invention for smart applications is to determine common third word or word string associations between or among two or more words or word strings selected by a smart application. The user can define ranges in the document database as any number of words and/or word strings in proximity to each occurrence of each selected word and/or word string. The system then searches for words and/or word strings that are common to the ranges are common third words or word strings. The frequency of occurrence of common third words or word strings within the ranges of each selected word or word string can be stored in a frequency association database, shown in tables 3 and 4. Alternatively, the locations and frequency of occurrence of words recurring in the document database can be stored in a recurring word and word string database, also referred to herein as a Reocurrence Database, an example of which is shown in table 5. Using these databases, the association program 304 can establish the highest ranked third word and word string relationships shared by the two or more words or word strings selected by the smart application 302, based on user-defined weighting or other criteria.

Association Database Building within User-Defined Range

Disclosed is a method for building one type of association database herein referred to as a frequency association database that can be applied to documents in a single language for purposes of building a database of related words and word strings based on their proximity to one another in the text. An example of the frequency association database is shown in table 3. The method includes a. Assembling a corpus of text in a single language in a "Document Database", the larger the corpus the better.

b. Searching every word or word string for multiple occurrences of that word or string in the Document Database.

c. Establishing a user-defined number of words or word strings on either side of the word or word string to be analyzed. This will serve as the Range. In addition to being defined as a certain number of words, the Range may be defined as broadly (all words in the specific text in which the word or word string occurs) or as narrowly (a specific sized word string in an exact proximity to the analyzed word or word string) as the user may define for the specific application.

d. Determining the frequency with which each and every word and word string appears in the ranges around the selected word or word string being analyzed and, if desired, their proximity to the selected word or word string.

An example of the association building among a large number of documents in a single language follows. Sentence 1 and Sentence 2, shown in Table 2, are two among many sentences in the Document Database, as the entire corpus can be analyzed in its entirety with all of the results added to the frequency chart:

TABLE 2

| | |
|---|---|
| Sentence 1 | "I went to the doctor and I was sneezing a lot and he told me that the cold and the flu are going around like crazy and I should rest, keep taking Vitamin C, and a little chicken soup wouldn't hurt." |
| Sentence 2 | "As a doctor, I'm constantly seeing sneezing, red eyed patients asking what they can do to treat the flu, to which I reply, "the only things that really work are rest and time" |

The system will look for recurring words or word-strings. The only recurring words and word strings between the two sentences are:

"I", "to", "the", "doctor", "and", "sneezing", "a", "that", "flu", "are", "rest"

As described in U.S. application Ser. No. 10/024,473, for certain applications the system can be instructed to recognize and disregard common words such as "I", "a" "to" etc. However, those common words will be considered and included in a database at times depending upon the goal of the specific application for the system. If the common words are disregarded, this would leave:

"Doctor", "sneezing", "flu", and "rest"

If the range is defined as including, for example, up to 30 words on either side, the system will record the frequency of occurrence of every word and word string within 30 words of each of these words. In addition, the system can also note the proximity of each word or word-string to the word or word string being analyzed. Since each of these words appears within the 30 word range of each of the other words in both sentences, each word would have a frequency of one for each of the others as follows in Table 3, which shows an embodiment of a Frequency Association Database:

TABLE 3

| Word/String | Association Word/String | Freq. |
|---|---|---|
| doctor | sneezing | 1 |
|  | flu | 1 |
|  | rest | 1 |
| Sneezing | doctor | 1 |
|  | flu | 1 |
|  | rest | 1 |
| Flu | sneezing | 1 |
|  | doctor | 1 |
|  | rest | 1 |
| Rest | sneezing | 1 |
|  | doctor | 1 |
|  | flu | 1 |

In addition to taking note of the frequency with which words and word strings appear anywhere within ranges of the words and word strings being analyzed, the association database can be built based on frequencies of word and word strings appearing exactly X words away from the word or word string being analyzed. In such cases the range would be defined narrowly by the user for an application as one word or one word string of a specific size in an exact proximity to the word or word string being analyzed.

For instance, the system can analyze the documents available in the Document Database to determine that they include the phrase "go to the game" 10,000 times and it may find "go to the game" within a 20 word range of the word "Jets" 87 times. In addition, the system may determine that "go to the game" appeared exactly 7 words in front of the word "Jets" 8 times (counting from the first word "go" of the word string).

Any combination of recurring patterns of words and word strings based on the number of words between them can also be recorded. For instance, the database can record the number of sentences in the database in which the word "Jets" appears 3 words before "go to the game" when "tickets" appears 9 words after "go to the game." That pattern may occur 3 times and the frequency of that word pattern in the text may be used by an application that will deduce the meaning of an idea to either help provide an answer to a question asked by the user, or help carry out a request made by the user. Based on Sentence 1 and Sentence 2 of Table 2, the frequency association database, shown in table 4, can be generated.

TABLE 4

| Word/String | Associated Words/Strings | Freq. | Freq. Exactly 4 Words After |
|---|---|---|---|
| doctor | sneezing | 1 | 1 |
|  | flu | 1 | 0 |
|  | rest | 1 | 0 |
| sneezing | doctor | 1 | 0 |
|  | flu | 1 | 0 |
|  | rest | 1 | 0 |
| flu | sneezing | 1 | 0 |
|  | doctor | 1 | 0 |
|  | rest | 1 | 0 |
| rest | sneezing | 1 | 0 |
|  | doctor | 1 | 0 |
|  | flu | 1 | 0 |

As indicated in table 4, of the recurring words within the range of Sentence 1 and Sentence 2, only one word, "sneezing," appears twice exactly four words after one of the words being examined. These tables indicating exact recurring word patterns in text based on their proximity to each other measured by the number of words between them can be generated individually using a series of narrowly defined ranges.

A large number of calculations may be required, if the above method is used to build a database of all of the proximity and frequency relationships between all recurring word patterns in the available text as described above. Many relationships being built as a result of this comprehensive process may never be used for an application. The following technique involves indexing recurring word strings, to avoid upfront processing that may never be used.

The following indexing process can be used as an alternate process to the method described above for automatically determining frequency and proximity associations, and to perform general range frequency analysis and an analysis of exact patterns based on specific word or word string locations within a range as described above. This embodiment of the invention is a method for building a recurring word and word string database (or Recurrence Database), which includes the location of each recurring word and word string in the document database is as follows: 1. Search for all words and word strings for recurrences in the available text. 2. Record in the database the "locations" for each word and word string with multiple occurrence by noting its position in each document in which it occurs, for example, by identifying the word number of the first word in the string, and the document number in the document database. Alternatively, just the document number of the document in the document database in which the word or word string is located can be stored. In this case, the position of the word or word string can be determined when responding to a query.

Table 5 is an example of entries in the Recurrence Database.

TABLE 5

| Word or Word String | Frequency and Location |
|---|---|
| "kids love a warm hug" | 20 times (word 58/doc 1678; word 45/doc 560; word 187/doc 45,231; word 689/doc 123; . . . ) |
| "kids love ice cream" | 873 times (word 765/doc 129; word 231/doc 764,907; word 652/ doc 4,501; . . . ); |
| "kids love a warm hug before going to bed" | 12 times (word 58/doc 1678; word 45/doc 560; word 187/doc 45,231; . . . ) |
| "kids love ice cream before going to bed" | 10 times (word 765/doc 129; word 231/doc 764,907; . . . ) |
| "kids love staying up late before going to bed" | 17 times (word 23/doc 561; word 431/doc 76,431; . . . ) |
| "before going to bed" | 684 times (word 188/doc 28; word 50/doc 560; word 769/ doc 129; word 436/doc 76,431; . . . ) |

As indicated, each occurrence of a word or word string found more than once in the Document Database will be added to the frequency count and its location noted by designating the word number position in a document as well as the number assigned to identify the document in which it occurs, or by using any other identifier of the word or word string's location in the document database.

If the Recurrence Database is fully and completely generated (including word number positions as well as document numbers) for all documents in the Document Database, the location information allows the system to calculate any general frequency relationships generated, or any specific word pattern frequency relationships generated as described above.

Additionally, if the Recurrence Database has not yet been built, the system can perform the frequency analysis on two or more ranges on the fly. Any word or word string recurrence not yet in the Recurrence Database can be included while the system responds to a query by analyzing documents in the document database directly to supplement analysis of the Recurrence Database. After the information obtained by direct analysis of the documents in the Document Database has been used for the specific task for which it was generated, the information can then be stored in the Recurrence Database for any future use. Whether the system builds a frequency analysis using the Recurrence Database, or whether those relationships are created on the fly, the result is a database of word and word string associations to which smart applications can be applied.

Referring now to FIG. 3, in a common frequency analysis process, smart application 302 can query the frequency association database or the Recurrence Database, via the association program 304, with two or more words or word strings to establish what other third words or word strings are frequently associated with some or all of the presented word strings. The system can employ two different methods when performing the Common Frequency Analysis (CFA): either 1) Independent Common Frequency Analysis, or 2) Related Common Frequency Analysis. Additionally, the system can do further statistical analysis after employing either of the two processes by extending them an additional generation or generations, or by combining the results and/or segments of any CFA for further CFAs.

Independent Common Frequency Analysis (ICFA)

When the smart application 302 presents the association program 304 with two or more words and/or word strings for CFA, the system can identify all words and word strings frequently related to the presented words using an association database of the present invention. The system can then identify those words and/or word strings that are frequently associated to some or all of the presented words and word strings.

The system can then use the common associations among the presented words and/or word strings in a variety of user-defined ways. For example, the system can identify the highest-ranking common association by adding (or multiplying or any other user defined weighting) the frequencies for a common, or third word or word string association of the presented words and/or word strings in a frequency association database. As another example of a user defined parameter, a minimum frequency (as measured by total rank, raw number or any other measure) on all tables of presented words and/or word strings may be required.

In using entries in the Recurrence Database example, the system can determine the frequency with which "ice cream" and "kids love" are within a user-defined range in all available documents as one analysis and the system can then record the frequency with which "ice cream" and "before going to bed" appear together. The frequency of each of the independent relationships can then be used by an application that will give relative value to each. This will be based on how high (user defined as either absolutely or relatively) the frequency of ice cream ranks on both a "kids love" frequency table and a "before going to bed" frequency table, or the percentage of time the association (e.g. "ice cream") appears with the word or word string (e.g., "kids love") relative to the total number of times the word string (e.g., "kids love") appears. Once again, the "kids love" and "before going to bed" frequency tables are tabulated rankings of the occurrence of third words or word strings within defined ranges based on their proximity to the selected word strings "kids love" and "before going to bed."

Based on user-defined values, this method, after analyzing "ice cream" can then analyze "a warm hug" by locating it on the "kids love" frequency table (based on the user defined range or proximity requirements of the application) for relative frequency and then locate "a warm hug" on the "before going to bed" frequency table. All other frequent associations (user defined) on both frequency tables will be compared, for example "staying up late", and scored based on user-defined values of combined relative frequencies from both tables. The highest-ranking word string, based on user defined weighting of each frequency association, will be produced by the system. The result of this analysis may be that the system will identify that, while "kids love" "ice cream" more than "warm hugs," "kids love warm hugs" more than "kids love ice cream" "before going to bed."

As another example if the system was presented with the word "kangaroos" and the word and word strings "find" and "in America", for Independent Common Frequency Analysis table 6 shows a frequency table that may be assembled based on the documents in the Document Database.

TABLE 6

| | ASSOCIATIONS | | |
|---|---|---|---|
| | "Australia" | "the Zoo" | "New Zealand" |
| "kangaroos" | 21,000 | 7,000 | 1,000 |
| "find" | 1,000 | 2,000 | 500 |
| "in America" | 300 | 5,000 | 100 |
| Total | 22,300 | 14,000 | 1,600 |

"Australia" ranks highest based on a total of the raw cumulative associations. However, user-defined parameters may weigh the relative frequencies. An example of one possible method may be to score the least found association as a one and then score the higher associated frequencies as a multiple of that number. In this case "the Zoo" will rank highest.

TABLE 7

| | "Australia" | "the Zoo" | "New Zealand" |
|---|---|---|---|
| "kangaroos" | 21 (21× the lowest) | 7 (7× the lowest) | 1 (the lowest) |
| "where can I find" | 2 | 4 | 1 |
| "in America" | 3 | 50 | 1 |
| Total | 26 | 61 | 3 |

The relative weights among the associations show how Zoo will be the outcome based on the above user-defined parameter. Similar results can be achieved by multiplying the number of times a specific word or word string is associated to each of the queries to give weight to the relative balance between common associations. In our example the results will return "the Zoo":

| 1. "the Zoo" | 7,000 × 2,000 × 5,000 = | 70,000,000,000 |
|---|---|---|
| 2. "Australia" | 21,000 × 1,000 × 300 = | 6,100,000,000 |
| 3. "New Zealand" | 1,000 × 500 × 100 = | 50,000,000 |

Other user-defined criteria can be employed to rank and choose associations common among two or more presented words and/or word strings. This may include weighing certain associations in certain categories more than others. For example, an application may assign a higher value to a "location" association (e.g., "in America") for a "where?" question (e.g., "where can you find kangaroos in America?").

Related Common Frequency Analysis (RCFA)

In addition to finding common independent associations among two or more presented words and/or word strings, another embodiment may look to identify frequent appearances of words and or word strings that are found in user-defined ranges in only those documents containing two or more of the words or word strings being analyzed.

This embodiment employs the following steps:
  a. Locate all document numbers from the database common to two or more of the presented words and/or word strings.
  b. Compare each word and word string in the user-defined ranges around all the presented words and/or word strings and record the frequency for all recurring word and word strings in the ranges. Once again, the user-defined range can be narrow and include just recurring word or word strings in a specific proximity to the presented words or word strings.

As an example, assume the system is presented with the two word strings "kids love" and "before going to bed" for RCFA. If the database already contains the following entries corresponding to the phrases in the documents in the Document Database:

| | |
|---|---|
| "kids love a warm hug" | 20 times |
| "kids love ice cream" | 873 times |
| "kids love a warm hug before going to bed" | 12 times |
| "kids love ice cream before going to bed" | 10 times |
| "kids love staying up late before going to bed" | 17 times |
| "before going to bed" | 684 times |

The Recurrence Database can direct the system to the documents in the document database that have both "kids love" and "before going to bed" because they have the same document number associated to them. In addition, if desired the system can locate only those documents where the word strings are within the user-defined number of words of each other or in any other user defined qualifying proximity to one another.

Once the system has identified all documents in the document database that contain "Kids love" within a designated proximity to "before going to bed" the system can build a frequency chart of all recurring words and word strings within a user-defined range. Based on the limited sample of the word and word-string database above, we know that "ice cream" will show up with at least a frequency of 10, "staying up late" at least a 17 frequency, and "a warm hug" at least a 12 frequency. All of these frequencies may be much higher as they can occur in the same text near "kids love" and "before going to bed" and not just directly adjacent to them (e.g., "kids love ice cream and other sweets before going to bed").

The response to the query "what do kids love before going to bed?" has many potential "correct" answers. Nevertheless, with a critical mass of documents reflecting various representative opinions, the various higher frequencies will reflect the consensus view on the question, and the lower frequencies will reflect existing alternative views. For instance "hot shower" may be within the range with "kids love" and "before going to bed" 3 times, which indicates a pattern of preference that is not nearly as popular an opinion as some others.

For either the ICFA or the RCFA, a thesaurus or any other known or determined word-string equivalents can be used in place of the searched words and word strings to find recurring words and word strings around those word equivalent's ranges as alternative embodiments of the invention. For instance, the system can also search "kids like", "kids really love", "kids enjoy", "children enjoy", "children love", in place of "kids love". The same technique can be used to replace "before going to bed" with known equivalents to the system like "before bed", "before going to sleep", "before bedtime". A combination of a word thesaurus known in the art and/or the common frequency techniques of the present invention will yield a large number of semantically equivalent word and word strings. A general explanation of how, using the association databases and a smart application 302, the system detects semantically equivalent word strings through common frequency analysis will be described. The system can also run the ICFA and the RCFA on the presented words and word strings and combine the results using user defined weighting.

Second Level Frequency Analysis

In another embodiment, the system may perform frequency analysis using the common association between either the $1^{st}$ or $2^{nd}$ word or word string, and the selected $3^{rd}$ word or word string as the common frequency between the two words or word strings being analyzed which will add new information to the analysis performed for an application. For example, if the selected common association between the frequency of all words and word strings within the common range of "before going to bed" ($1^{st}$) and "kids love" ($2^{nd}$) is "ice cream" ($3^{rd}$), this embodiment generates either an independent or relative frequency analysis between either "before going to bed" ($1^{st}$) and "ice cream" ($3^{rd}$), or "kids love" ($2^{nd}$) and "ice cream" ($3^{rd}$), and selecting associations based on those two frequency analysis. Moreover, any two or more word or word strings can be analyzed using the same techniques in as many combinations of as many generations as the user defines. Specific applications will call for automated analysis identifying which common frequency analysis to perform on each generation of association frequency analysis. More complex applications will identify two or more frequency analysis be performed before the two or more independent results are used in combination.

Use of Common Frequency Analysis to Determine Word Function or Meaning

As described in U.S. application Ser. No. 10/024,473, the high-frequency associations built between the word and word strings being analyzed and the word and word strings within their ranges that are not translations but are closely related ideas can be used for artificial intelligence applications. An artificial intelligence or smart application is an application that can answer a question or perform a task it has not necessarily been asked to answer or perform in the past. The present invention can utilize the association databases to identify formations and/or patterns of words and word strings that can be used as category indicators to identify the function or purpose of other words or word strings associated with the category indicators. For example a particular pattern of words may normally be associated with a word that is a person's name, a type of food, or an action. Using CFA, the present invention can analyze documents to reveal the existence of these patterns and their association with other words or word strings. Based on this association, the system can categorize other words that are similarly associated with these patterns, because other words that are similarly associated are likely to fall within similar categories. Thus, the system can identify the presence of and can make use of category indicators.

One example of such an application would be to aid the present invention translation method in completing translations that the system cannot otherwise resolve using the previously described processes. For example, assume the system received the English language query, "I love Moshe", to be translated into Language X. Assume the system has the translation of the word string "I love", but does not have the translations for "I love Moshe" or "love Moshe".

The association database has the word "Moshe" in word strings, like "my name is Moshe," "Mr. Moshe Fein," "his name is Moshe." CFA can be used to identify the relationship between these word strings and the name Moshe. A user can then identify these phrases to the system as highly correlative to names and are therefore name indicators, a particular type of category indicator. Once Moshe appears in a user defined number (or percentage) of the "name indicator" phrases, the system will determine with statistical certainty that "Moshe" is a potential name because it occurs in text that are "name indicators."

While other systems known in the art also incorporate these name indicators, and other category indicators for, for example dates, numbers and other specific classes, the present invention can use the manually encoded indicators like phrases indicating names to identify all the other phrases that names like Moshe and other known names also appear in. For example, the user may not have thought to add as a name indicator "the guy's name is" but the present invention will present it and many others a user would not have include using this embodiment. Each word and word string has a limited universe of possible alternative word or word strings that can be found among the surrounding words and word strings. This universe will include words and word strings expressing precisely the ideas they are replacing and will range away from the idea originally expressed to thoughts that are exact opposites. For example, if the phrase "I love chocolate" is examined, the system can generate all possible substitutions for the word "love." The system will generate equivalents and near equivalents like "I really love chocolate", "I adore chocolate", "I really enjoy chocolate", as well as non-equivalents and opposites like "I tolerate chocolate" and "I hate chocolate". The system will not find recurring frequencies of words that do not fill the whole left by the word love using the independent (or alternatively an embodiment of related) common association frequency analysis. For instance the databases in the analysis will not produce "I fish chocolate", "I you chocolate" "I who chocolate".

Once the system establishes that Moshe is a name and if "I love" is a name indicator (but not one in which we have ever seen Moshe) then, if the Translation Engine has the translation for "Moshe" in Language B, it can attach it to the "I love" translation in Language B without an overlap. If the translation for "Moshe" in Language B is not known, a transliteration function from English to Language B can be used to generate the Language B representation of the name "Moshe" and attached it to the Language B translation for "I love", without an overlap.

Names that are clearly related to other words and/or word strings as names is a simple example of how a user identifying common statistical relationships between word strings representing ideas can be categorized by a general meaning to be leveraged for a smart application. Moreover all word strings will have their dynamic relationships to all other related concepts and ideas, illustrated by the in-language association databases that list related ideas based on their frequency of close proximity to one another when they are expressed in language. Each word string making up a coherent idea will have its universe of related ideas in frequently recurring patterns in text within certain proximity to one another for the system to extract probabilities of meaning for those ideas in any given context.

If, for example, a translation query involves a word that is not clearly a name, the frequency among related ideas can be examined on the next level of neighboring words and word strings to provide further context. For example, if the query in English to be translated into Language B is "I love Faith", this is somewhat ambiguous, because Faith can either be either a name or "a feeling of belief without proof".

If the other neighboring words near the phrase "I love Faith" in the complete translation query are "her" and "she" but are not "god", "religion", "church", etc., the system will apply formulas that weigh frequency, proximity as well as other category indicators to the associations existing in its database and "know" to chose the translation of the "name" Faith, not the "belief without proof" Faith. Other neighboring words and word strings with their set of frequent relationships to other ideas will yield further evidence of the speakers intention until statistical significance fixes the answer, or the system queries the user for clarification based on a lack of information. This would happen, for example, if the entire query was "I love Faith." Since it is somewhat ambiguous, even a human translator might ask, "do you mean the word Faith to refer to a person?"

In the case of English, since most upper-case first letters will indicate that the "name" Faith is intended. This is another attribute the system can work with to determine that Faith is probably a name. Many non-Latin character based languages do not have upper-case/lower-case characters and therefore this sort of issue will rely on the pure level-upon-level relationship between word strings related by frequent proximity to one another in text, and any other representation of language (voice, symbols, signs, etc).

Use of Common Frequency Analysis to Locate Semantically Similar Words

Words and word strings in a language that represent a particular idea often occur in patterns. These patterns can be represented by the frequency with which specific words and word strings are found immediately prior to a particular word (in English, to the left of the particular word) as well as following the particular word (in English, to the right of the particular word). Thus, words and word strings representing ideas that are alike will have commonality in the type and order of the words and word strings leading into and away from them.

Another example of using the word patterns to generate information is in the creation of a comprehensive word and word string equivalent thesaurus. If the system is asked to identify a word that means the same or almost the same as another word, i.e. the words are semantically similar, the system can find the word and word string frequencies associated with that word and look for the word in that language whose associations frequencies most closely match it. Typically the more similar the formations between two words and/or word strings are, the more similar in meaning they are. Sometimes, opposites will share high frequency common associations, but will diverge strongly on certain important qualitative associations that create an "opposites signature" pattern that the system can provide for applications as well.

The character of the association between any idea represented by a word or word string and any other idea represented by a word or word string, the "association signature," will be revealed by the system. The system uses the association databases to detect specific word formations within user defined ranges tailored to detect word patterns surrounding an idea that defines the relationship between the idea and other ideas in a relational proximity to it. Program4, set forth in the computer program listing appendix, is an example of a program that uses common frequency analysis to locate semantically equivalent or similar words.

For example, one embodiment using a specific word formation around a word or word string using ICFA is to identify words and word strings that are equivalents or near equivalents in semantic value (i.e., meaning) to any word or word string. This embodiment involves: Step 1, receiving a query requesting a word or word string (the query word) to be analyzed for equivalents, and returning a word string (the returned word) of a user defined size that occurs with the highest frequency, as well as the occurrence frequency of returned word, where the returned word is located directly to the left of the query word in all available documents using ICFA. The larger the user defined word string, the more precise the ultimate results will be. Step 2, conduct an ICFA on each of a user defined number of the top ranked results from step 1 using a range of 1 word or word string to the right of each word or word string analyzed (the range of 1 word or word string means the system will rank the highest recurring words and word strings to the right of each of the word or word strings analyzed in step 2). The frequencies of all common word and word strings produced in Step 2 are then added. Step 3, conduct an ICFA on the Query using a range of a user defined number of words directly to the right side of the Query (again at least two or more words is typically desirable for accuracy). Step 4 conduct an ICFA on each of a user defined number of the top ranked words and word strings returned from Step 3 using a range of 1 word or word string directly to the left of each of the words and word strings being analyzed (again, the results of the 1 word or word string range directly to the left of the word or word string being analyzed will rank by frequency the words and word strings most often leading into each word and word string analyzed in step 4). The frequencies of all common word and word string results in Step 4 are then added. In Step 5, identify each word or word string that is produced by both Steps 2 and 4. The frequency number of each of the returned common words and word strings in Step 2 are multiplied by the frequency numbers of the common word or word string produced from Step 4. The highest ranked word or word strings based on the products of their frequencies from Step 2 and Step 4 results will be the most semantically equivalent or similar words and word strings to the Query.

An example of the embodiment to build a thesaurus of all word and word string equivalents in the system's document database, assume the word "detained" is entered by the user to determine all of the word and word string equivalents known to the system.

In Step 1, taking only the top three results (user defined) to simplify the illustration, the system will first determine the most frequent three word strings (user defined) directly to the left of "detained" as follows:
1. "the suspect was"
2. "was arrested and"
3. "continued to be"

In Step 2, the system finds words and word strings that most frequently follow the above three returned three word strings to the right, as follows:

| 1. "the suspect was" | a. | "arrested" (240 freq.) |
| | b. | "held" (120) |
| | . | "released" (90) |
| 2. "was arrested and" | a. | "held" (250) |
| | b. | "convicted" (150) |
| | c. | "released" (100) |
| 3. "continued to be" | a. | "healthy" (200) |
| | b. | "confident" (150) |
| | c. | "optimistic" (120) |

Then, the frequencies of common returns in Step 2 are then added. The only common returns in Step 2 are:

| a. "held" | 120 + 250 = 270 |
| b. "released" | 90 + 100 = 190 |

In Step 3, the system will determine the three most frequently occurring (user defined) two word strings (user defined) directly to the right of the selected query "detained" in the documents in the database:
1. "for questioning"
2. "on charges"
3. "during the"

In Step 4, the system will identify the most frequently occurring words and word strings that appear directly to the left of the three returned results in step 4 as follows:

| 1. "for questioning" | a. "held" (300) |
| | b. "wanted" (150) |
| | c. "brought in" (100) |
| 2. "on charges" | a. "held" (350) |
| | b. "arrested" (200) |
| | c. "brought in" (150) |
| 3. "during the" | a. "beautiful" (500) |
| | b. "happy" (400) |
| | c. "people" (250) |

Then, add all common results of step 4. The two common results in this example:

| a. "held" | 300 + 350 = 650 |
| b. "brought in" | 100 + 150 = 250 |

Step 5, Returns are produced by multiplying the frequencies of common returns of steps 2 and 4 as follows:

| 1. "held" | 650 × 270 = | 175,500 |
| 2. "arrested" | 200 × 240 = | 48,000 |

The above illustration is based on a relatively small number of documents in the document database. The document database can be larger and can include documents remotely accessible to the system via networks such as the Internet.

The above embodiment is one of many ways the present invention can use ICFA (or alternatively RCFA) to identify characteristics about ideas represented by words and word strings and the character of the relationship between a word or word string and any other word or word string. Other methods can be used based on the same core idea of leveraging the relationships between ideas defined by their frequency and proximity to one another in language, along with other category indicators, to solve more complex problems. This can involve conducting common frequency analysis on two or more different sets of segments and using combined results in a user-defined manner.

One example of a more complex relationship that can be identified is the pattern formed by the comparison of signatures of words or word strings that are the opposites of each other. To identify this pattern, a user will enter a word into the system (e.g. hot). The system will then identify all the frequencies of recurring words and word strings around this word (these generate the words "signature"). Next, the user will call on the system to identify all the frequencies of recurring words and word strings around the word or word string representing the opposite idea (e.g. Cold). The system will then look for a common pattern for overlapping ideas between the left side of the word hot and the right side of cold and between the left side of cold and the right side of hot.

The results are a pattern formed by the comparison of the two signatures that the system can then use to identify other word or word string pairs with similar pattern formed by the comparison of their signatures. Thus if the system is queried with a word or word string in a manner that seeks the opposite, the system will (1) identify all word and word strings surrounding that query, (2) identify the list of words and word strings that have signatures similar to the query, but not at the level of similarity that would identify them as a synonym, (3) then compare the signatures of these related (but not synonymous) words and word strings against the query and (4) compare the comparison identified in step 3 with the comparisons of signatures of previously identified opposite word or word string pairs. If any of the comparisons generated in step 3 have a pattern that is similar enough (user defined) to the pattern formed by signature comparisons between known opposites, the system will identify the word or word string from step 2 that contrasted with the query to form that pattern and identify it as the opposite of the query.

It should also be noted that user defined parameters for the system to produce word string equivalents (or any other relationship) can involve word strings in any close proximity to the query and not just directly adjacent to the query on the left or right side. Adjusting the user defined parameters will be desirable in applications where expression of semantic meaning is typically less efficient or less structurally conventional (e.g., conversations fixed in an Internet "chat room" medium and other types of conversations).

At it's core, the association database building technique involves (i) taking a unit of grouped data organized in a linear or ordered fashion, (ii) breaking the group of data down to all possible contiguous subsets of the whole, and (iii) building relationships between all subsets of data, based on frequent recurring (generally close) proximity to one another in all available units of grouped data. At the core of CFA, the system provides the frequently recurring proximity relationships between subset data segments to the user to help identify certain recurring patterns that define the "data signature" providing generalized information about any data related to that general "data signature". Therefore, the same techniques used in the database creation, and common frequency analysis can be employed to recognize patterns for many other types of data mining, text mining, target recognition, and any other application that requires the recognition of patterns.

As will be understood by those skilled in the art, many changes in the apparatus and methods described above may be made by the skilled practitioner without departing from the spirit and scope of the invention.

I claim:

1. A non-transitory, computer readable storage medium storing computer instructions which when executed cause a processor to:
    search at least one document for a query word or query word string, said at least one document being comprised of unstructured text;
    identify occurrences of said query word or said query word string in said at least one document;
    define, as user-defined first query ranges, words or word strings immediately preceding the occurrences of said query word or said query word string;
    define, as user-defined second query ranges, words or word strings immediately following the occurrences of said query word or said query word string;
    select one or more recurring words or word strings in the defined first query ranges as identified left contexts for said query word or said query word string;
    select one or more recurring words or word strings in the defined second query ranges as identified right contexts for said query word or said query word string;
    search said at least one document for one or more occurrences of said identified left contexts;
    search said at least one document for one or more occurrences of said identified right contexts;
    define, as first context ranges, words or word strings immediately following the occurrences of the identified left contexts;
    define, as second context ranges, words or word strings immediately preceding the occurrences of the identified right contexts;
    identify words and word strings that occur in both of at least one of said first context ranges and one of said second context ranges, as associated second words or word strings; and
    determine an association between the associated second words or word strings and the query word or the query word string.

2. The non-transitory, computer readable storage medium according to claim 1, wherein the query word or the query word string and the one or more recurring words or word strings are associated as being semantically similar or equivalent or of a common class or category.

3. A method for associating words and word strings in a language, the method comprising:
    searching, using a processor, at least one document for a query word or query word string, said at least one document being comprised of unstructured text;
    identifying occurrences of said query word or said query word string in said at least one document;
    defining, as user-defined first query ranges, words or word strings immediately preceding the occurrences of said query word or said query word string;
    defining, as user-defined second query ranges, words or word strings immediately following the occurrences of said query word or said query word string;
    selecting one or more recurring words or word strings in the defined first query ranges as identified left contexts for said query word or said query word string;
    selecting one or more recurring words or word strings in the defined second query ranges as identified right contexts for said query word or said query word string;
    searching said at least one document for one or more occurrences of said identified left contexts;
    searching said at least one document for one or more occurrences of said identified right contexts;
    defining, as first context ranges, words or word strings immediately following the occurrences of the identified left contexts;
    defining, as second context ranges, words or word strings immediately preceding the occurrences of the identified right contexts;
    identifying words and word strings that occur in both of at least one of said first context ranges and one of said second context ranges, as associated second words or word strings; and
    determining an association between the associated second words or word strings and the query word or the query word string.

4. The method according to claim 3, wherein the query word or the query word string and the one or more recurring words or word strings are associated as being semantically similar or equivalent or of a common class or category.

\* \* \* \* \*